(12) United States Patent
Uno

(10) Patent No.: US 8,171,184 B2
(45) Date of Patent: *May 1, 2012

(54) MULTIFUNCTION PERIPHERAL HAVING A PLURALITY OF FUNCTIONS

(75) Inventor: Fumitoshi Uno, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 913 days.

This patent is subject to a terminal disclaimer.

(21) Appl. No.: 12/055,112

(22) Filed: Mar. 25, 2008

(65) Prior Publication Data

US 2008/0239378 A1  Oct. 2, 2008

(30) Foreign Application Priority Data

Mar. 28, 2007  (JP) ................................ 2007-084772

(51) Int. Cl.
G06F 3/00  (2006.01)
(52) U.S. Cl. ........................................................ 710/16
(58) Field of Classification Search .................... 710/16
See application file for complete search history.

(56) References Cited

U.S. PATENT DOCUMENTS

| 5,903,733 | A | * | 5/1999 | Hong ............................ 709/232 |
| 7,111,121 | B2 | | 9/2006 | Oishi et al. |
| 7,526,580 | B2 | * | 4/2009 | Uno ................................ 710/14 |
| 2005/0240711 | A1 | | 10/2005 | Watanabe |
| 2007/0245359 | A1 | * | 10/2007 | Yamazaki et al. ............ 719/321 |

FOREIGN PATENT DOCUMENTS

| CN | 1707452 A | 12/2005 |
| JP | H11-008635 A | 1/1999 |
| JP | 2001-222503 A | 8/2001 |
| JP | 2004-054896 A | 2/2004 |
| JP | 2005-175936 A | 6/2005 |
| JP | 2006-178704 A | 7/2006 |
| JP | 2007-021817 A | 2/2007 |

OTHER PUBLICATIONS

The State Intellectual Property Office of the People's Republic of China; Notification of First Office Action in Chinese Patent Application No. 200810087465.X (counterpart to the above-captioned U.S. patent application) mailed Feb. 24, 2010.

Japan Patent Office; Office Action in Japanese Patent Application No. 2007-084772 (counterpart to the above-captioned U.S. Patent Application) mailed Mar. 10, 2009.

Patent Office of the People's Republic of China, Decision on Rejection for Chinese Patent Application No. 200810087465.X (counterpart to above-captioned patent application), issued Sep. 8, 2011.

* cited by examiner

*Primary Examiner* — Henry Tsai
*Assistant Examiner* — Eric Oberly
(74) *Attorney, Agent, or Firm* — Baker Botts L.L.P.

(57) ABSTRACT

A multifunction device has a plurality of functions selected from among a printer function, scanner function, facsimile function, and data storage function and capable of being connected to a computer via a Universal Serial Bus (USB) interface. The multifunction device includes: a device data outputting unit that outputs information forcing an OS in the computer to recognize the multifunction device as a USB storage class device having a plurality of USB-compliant logic unit numbers (LUNs) when establishing a connection with the computer; and a controlling unit that determines, when output data is transmitted from the computer, which one of the plurality of functions the output data is for controlling, based on the LUN included in the output data, and that controls the determined function based on the output data.

6 Claims, 13 Drawing Sheets

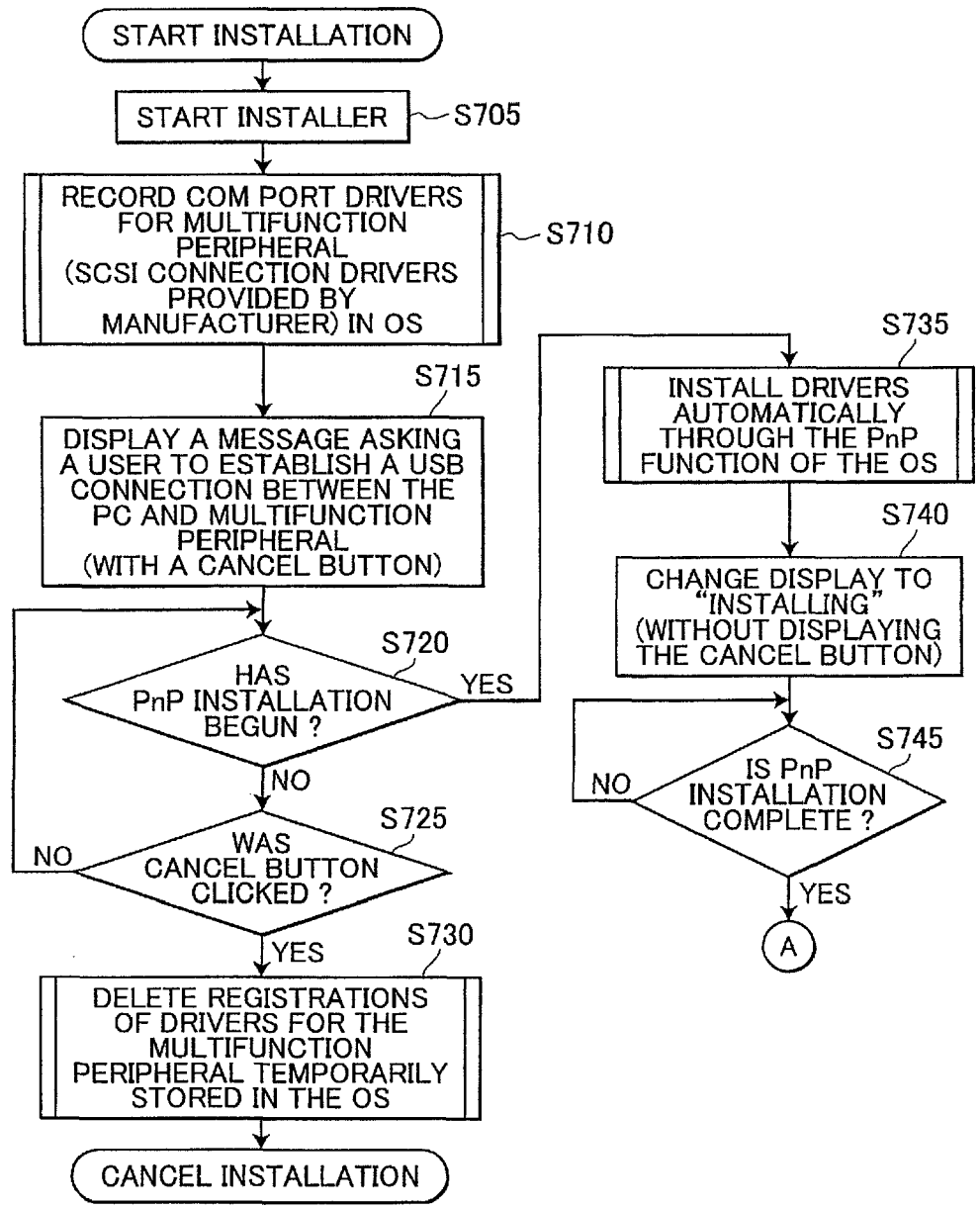

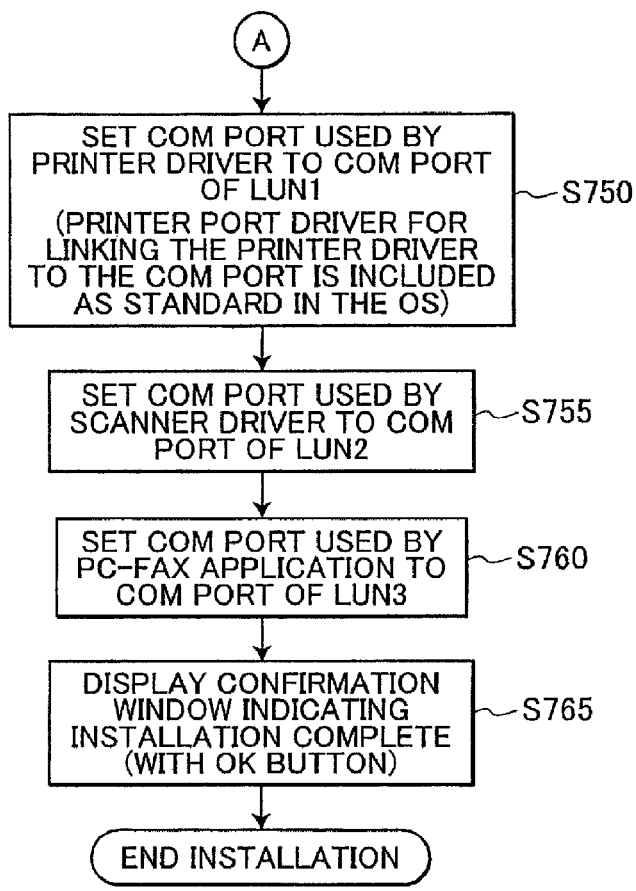

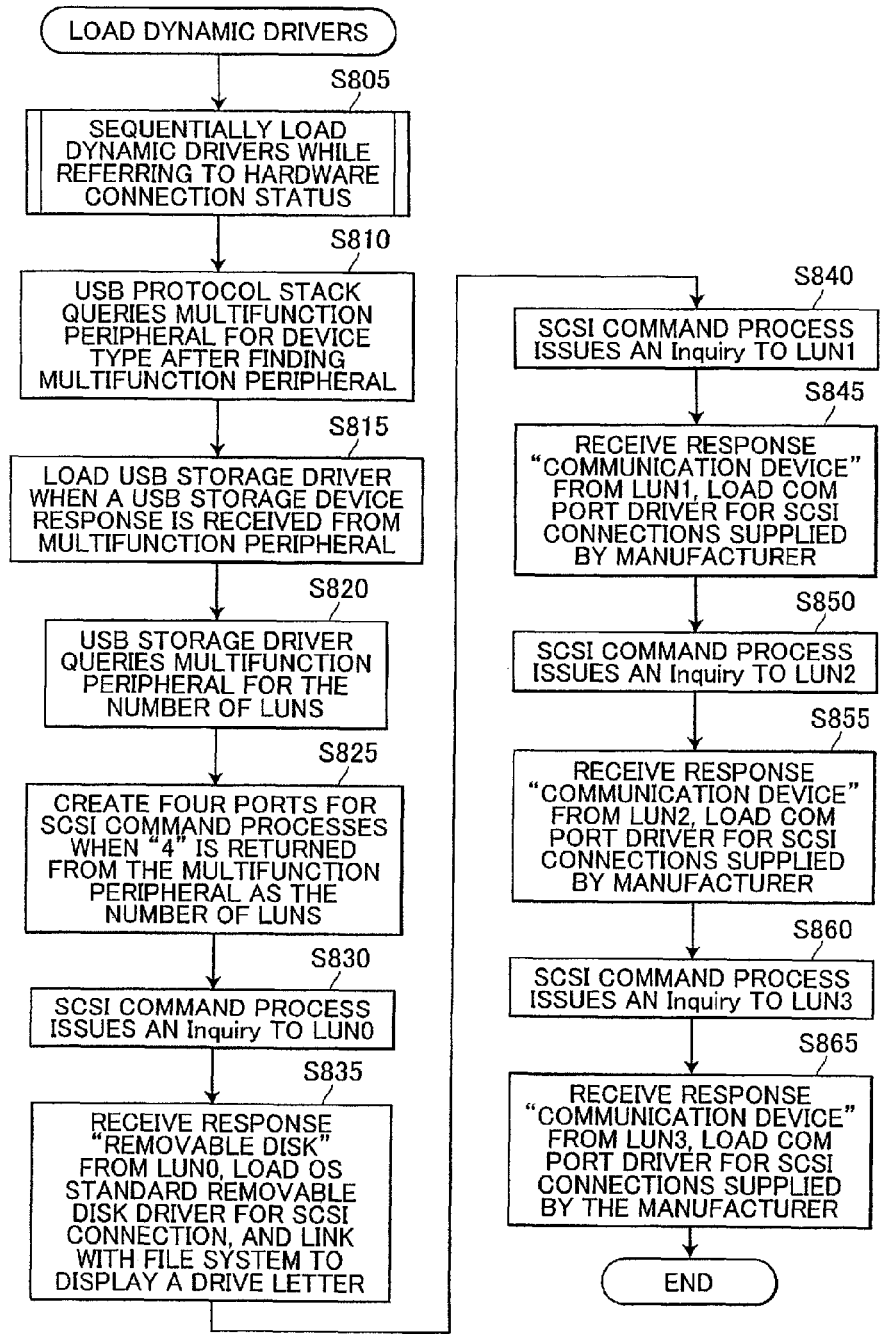

MULTIFUNCTION PERIPHERAL HAVING A PLURALITY OF FUNCTIONS

CROSS REFERENCE TO RELATED APPLICATION

This application claims priority from Japanese Patent Application No. 2007-84772 filed Mar. 28, 2007. The entire content of this priority application is incorporated herein by reference.

TECHNICAL FIELD

The present invention relates to a multifunction peripheral and a device control system.

BACKGROUND

A multifunction peripheral capable of being connected to a computer or the like via a USB (universal serial bus) interface has been produced commercially. A common configuration for such a multifunction peripheral known in the art includes endpoints for transferring data to a plurality of functions.

However, as the number of functions increases, the number of endpoints also increases, resulting in an expensive hardware construction that increases manufacturing costs for the multifunction peripheral. Hence, this configuration poses difficulties in providing a low-cost multifunction peripheral.

To resolve this problem, Japanese unexamined patent application publications Nos. 2001-222503 and 2005-175936 have proposed techniques for reducing the number of endpoints provided in a multifunction peripheral. The technology in Japanese unexamined patent application publication No. 2001-222503, for example, enables a host device to selectively access a plurality of functions via the same endpoints by emulating a device that disconnects from a device having one function and connects to a device having another function.

The technology described in Japanese unexamined patent application publication No. 2005-175936 reduces the number of endpoints used for transferring data by performing data transfers using a control endpoint provided separately from data transfer endpoints.

However, with the technology disclosed in Japanese unexamined patent application publication No. 2001-222503, the device driver must be switched on the host device side (disabling the driver not being used and loading and enabling the driver to be used) each time one of the functions on the multifunction peripheral is used. Accordingly, considerable time is required for switching device drivers, and two or more functions cannot be used simultaneously.

Further, with the technology disclosed in Japanese unexamined patent application publication No. 2001-222503, when operating one function on the multifunction peripheral, it is not possible to switch to a different function until the operation of the first function is reliably ended. Accordingly, it is difficult to determine a suitable timing for controlling this switch.

In the technology disclosed in Japanese unexamined patent application publication No. 2005-175936, the control endpoint is used for data transfers. Therefore, when a large amount of data is being transferred, this data transfer can interfere with control, making it difficult to perform required control promptly.

Hence, even though the conventional technologies described above can reduce the number of required endpoints, the multifunction peripheral is less user-friendly and may interfere with suitable control.

SUMMARY

In view of the foregoing, it is an object of the present invention to provide a multifunction peripheral capable of reducing the number of endpoints without reducing user-friendliness or interfering with suitable control, and a device control system for controlling the multifunction peripheral.

In order to attain the above and other objects, the invention provides a multifunction device having a plurality of functions selected from among a printer function, scanner function, facsimile function, and data storage function and capable of being connected to a computer via a Universal Serial Bus (USB) interface. The multifunction device includes: a device data outputting unit that outputs information forcing an OS in the computer to recognize the multifunction device as a USB storage class device having a plurality of USB-compliant logic unit numbers (LUNs) when establishing a connection with the computer; and a controlling unit that determines, when output data is transmitted from the computer, which one of the plurality of functions the output data is for controlling, based on the LUN included in the output data, and that controls the determined function based on the output data.

According to another aspect, the present invention provides a device control system including: a computer; and a multifunction device having a plurality of functions selected from among a printer function, scanner function, facsimile function, and data storage function. The computer and the multifunction device are connected with each other via a universal serial bus (USB) interface. The multifunction device includes: a device data outputting unit that outputs information forcing an OS in the computer to recognize the multifunction device as a USB storage class device having a plurality of USB-compliant logic unit numbers (LUNs) when establishing a connection with the computer; and a device controlling unit that, when output data is transmitted from the computer, determines which one of the plurality of functions the output data is for controlling, based on the LUN included in the output data, and that controls the determined function based on the output data. The computer includes a computer controlling unit that transfers output data from the computer to the multifunction device, based on an instruction issued from a data processor provided in the computer to control one of the plurality of functions, the output data including an LUN corresponding to the function that is the target of control.

BRIEF DESCRIPTION OF THE DRAWINGS

In the drawings:

FIG. 6 is a flowchart illustrating steps in a process executed on the PC while the power to the PC is on;

FIG. 11 is a flowchart illustrating a part of steps in an installation process executed by the PC for installing multifunction peripheral software according to the second embodiment;

FIG. 12 is a flowchart illustrating another remaining part of the steps in the installation process executed by the PC for installing multifunction peripheral software according to the second embodiment; and FIG. 13 is a flowchart illustrating steps in a process executed on the PC for loading dynamic drivers according to the second embodiment.

DETAILED DESCRIPTION

Figure 1:
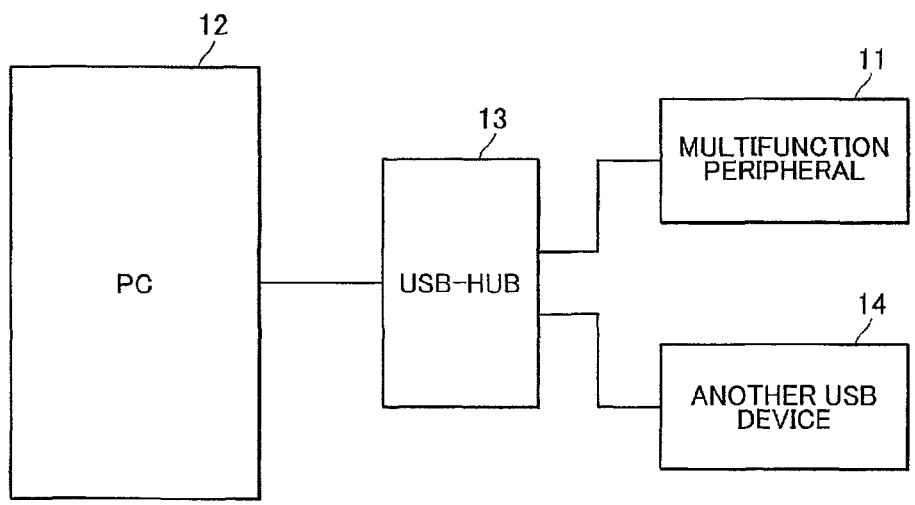
FIG. 1 is a block diagram showing an overall device control system according to a first embodiment of the present invention.

A multifunction peripheral according to embodiments of the invention will be described while referring to the accompanying drawings wherein like parts and components are designated by the same reference numerals to avoid duplicating description.

(1) First Embodiment

Structure of a Device Control System

FIG. 1 is a block diagram showing the overall structure of a device control system according to a first embodiment of the present invention.

The device control system includes a multifunction peripheral 11 and a personal computer (PC) 12. Both the multifunction peripheral 11 and PC 12 have a USB interface and are connected to each other via a USB hub 13 so that data can be exchanged between the two. Another USB device 14, for example, is also connected to the USB hub 13.

In the embodiment, the multifunction peripheral 11 is a device possessing multiple functions, including a printer function, scanner function, PC-FAX function, and card reader function (data storage function). These functions can be controlled from the PC 12.

Internal Structure of the Multifunction Peripheral

Figure 2:
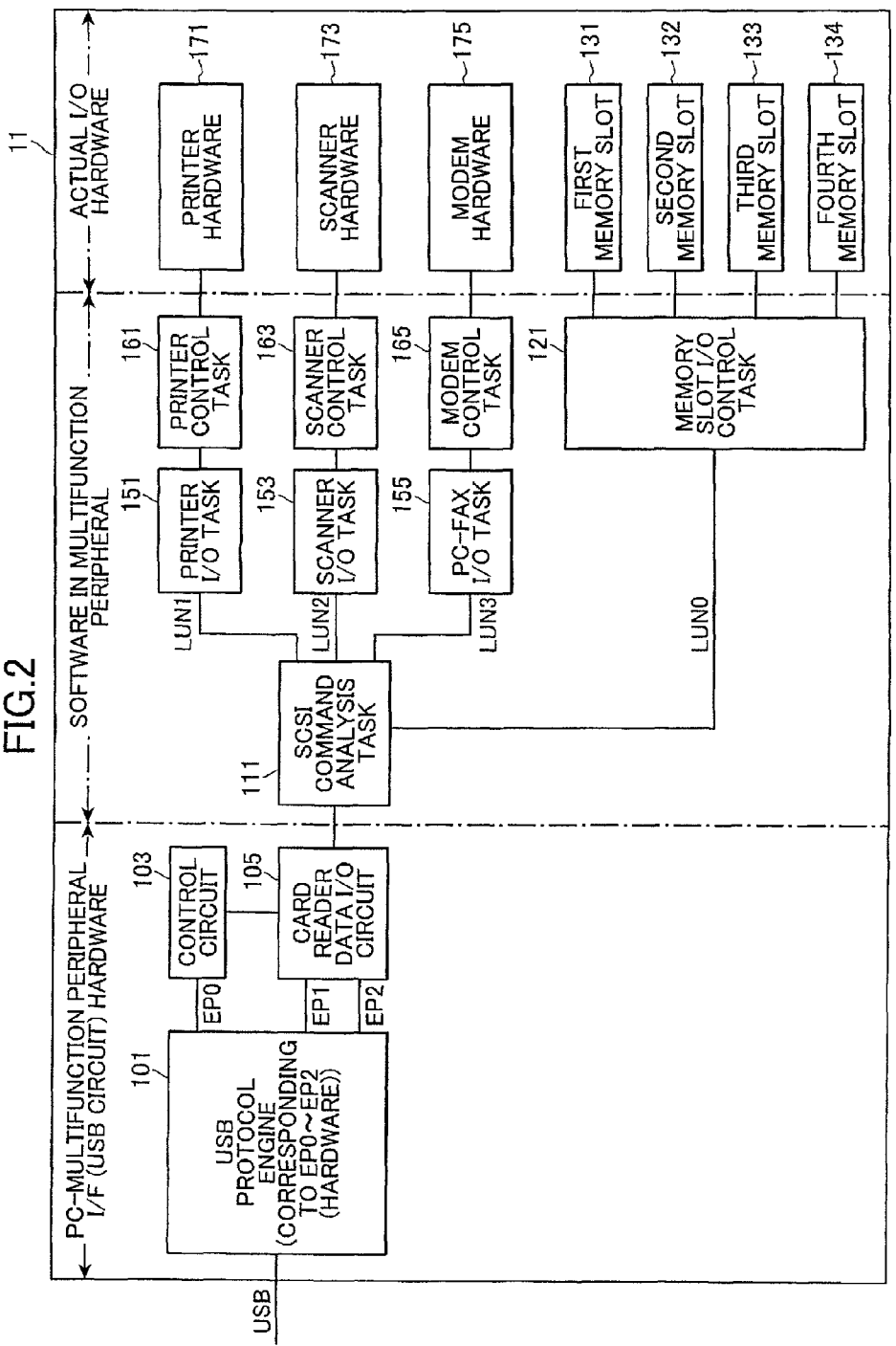
FIG. 2 is a block diagram showing the internal structure of a multifunction peripheral according to the first embodiment.

FIG. 2 is a block diagram showing the internal structure of the multifunction peripheral 11. The multifunction peripheral 11 is equipped with hardware constituting a USB interface, including a USB protocol engine 101, a control circuit 103, and a card reader data I/O circuit 105. The USB protocol engine 101 controls data transfers between the multifunction peripheral 11 and PC 12 according to the USB communication protocol.

This hardware is configured so that data is transferred between the PC 12 and the multifunction peripheral 11 via endpoints. More specifically, the control circuit 103 inputs and outputs various control data to and from the PC 12 (bi-directional communications) through a control transfer endpoint (hereinafter abbreviated as EP0).

On the other hand, the card reader data I/O circuit 105 transfers input data to the PC 12 through an input data endpoint (hereinafter abbreviated as EP1), and acquires output data transferred from the PC 12 via an output data endpoint (hereinafter abbreviated as EP2).

The multifunction peripheral 11 is also provided with a SCSI command analysis task 111 as one of its software functions. When data is transferred from the card reader data I/O circuit 105 to the SCSI command analysis task 111, the SCSI command analysis task 111 redirects the data to one of four data processing systems corresponding to LUN0-LUN3 based on information included in the data, that is, LUN data included in a USB-compliant data array contained in the data.

When data is transferred to the SCSI command analysis task 111 from one of the four data processing systems corresponding to the LUN0-LUN3, the SCSI command analysis task 111 transfers this data to the card reader data I/O circuit 105.

When redirecting data to the data processing system corresponding to LUN0, the SCSI command analysis task 111 transfers this data to the memory slot I/O control task 121. The memory slot I/O control task 121 is software functioning to control a first memory slot 131, a second memory slot 132, a third memory slot 133, and a fourth memory slot 134.

Each of the first through fourth memory slots 131-134 is a slot that accepts a memory card and each slot accepts a memory card of a different standard than the other slots.

In the embodiment, the first through fourth memory slots 131-134 are configured for exclusive use. For example, when a card is inserted into the first memory slot 131, other slots are unusable until that memory card is removed.

On the other hand, when diverting data to the data processing system corresponding to LUN1, the SCSI command analysis task 111 transfers the data to a printer I/O task 151. Data transferred to the printer I/O task 151 is further relayed to a printer control task 161 for controlling a printer hardware 171.

On the other hand, when diverting data to the data processing system corresponding to LUN2, the SCSI command analysis task 111 transfers the data to a scanner I/O task 153. Data transferred to the scanner I/O task 153 is further relayed to a scanner control task 163 for controlling a scanner hardware 173.

On the other hand, when diverting data to the data processing system corresponding to LUN3, the SCSI command analysis task 111 transfers the data to a PC-FAX I/O task 155. Data transferred to the PC-FAX I/O task 155 is further relayed to a modem control task 165 for controlling a modem hardware 175.

Internal Structure of the PC

Figure 3:
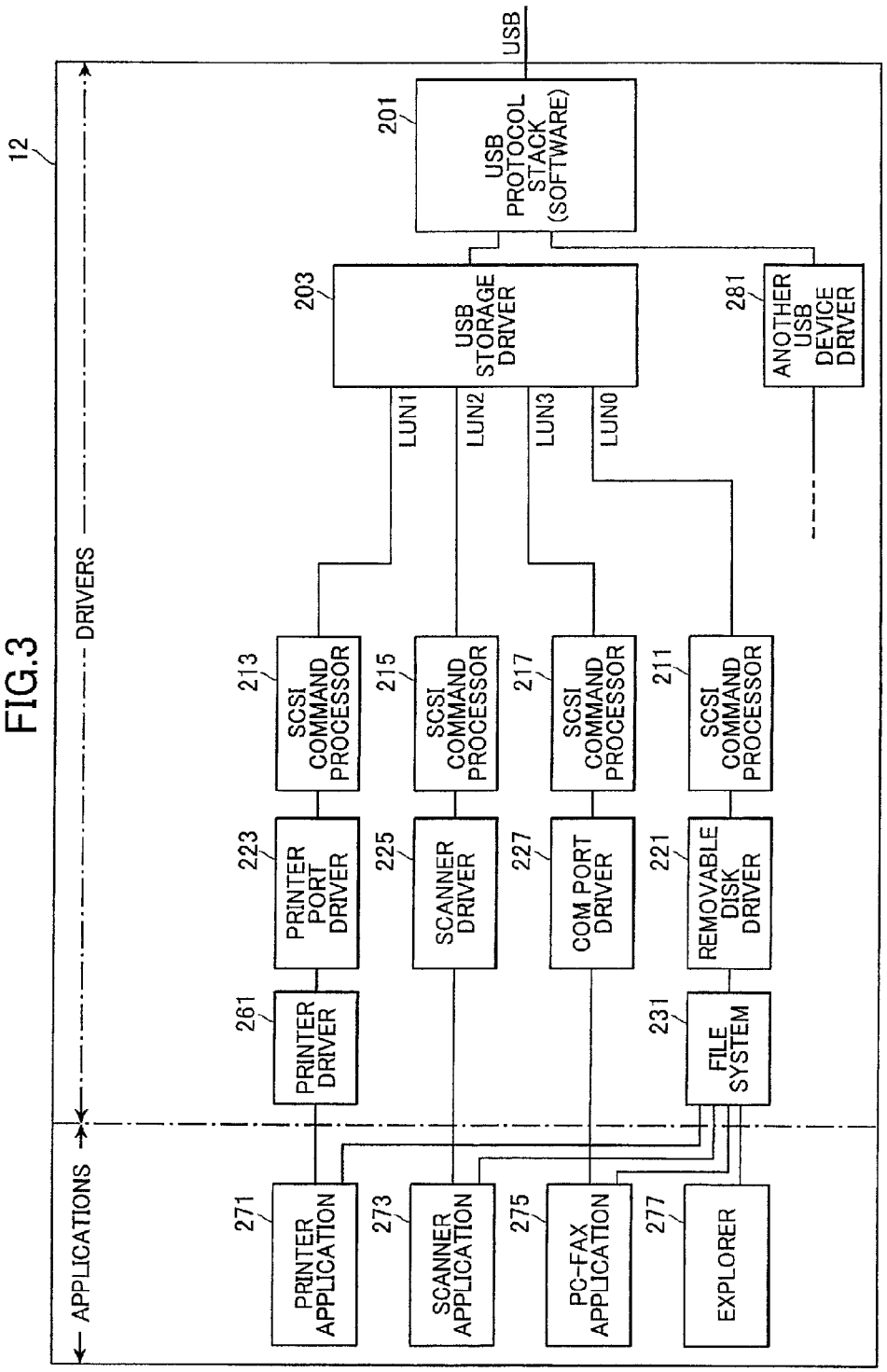
FIG. 3 is a block diagram showing the internal structure of a PC according to the first embodiment.

FIG. 3 is a block diagram showing the internal structure of the PC 12. The PC 12 has standard functions of the OS, such as a USB protocol stack 201; USB storage driver 203; SCSI command processors 211, 213, 215, and 217; a removable disk driver 221; and a file system 231.

The PC 12 also has special software for the multifunction peripheral 11 functioning as a printer port driver 223, a scanner driver 225, a COM port driver 227, and a printer driver 261.

The PC 12 also includes application software that uses the above functions, such as a printer application 271, a scanner application 273, and a PC-FAX application 275.

The OS installed on the PC 12 is Windows (registered trademark) in the embodiment. Therefore, the PC 12 also includes Explorer 277 as software that comes bundled with Windows. However, an OS other than Windows may be installed on the PC 12, provided that the OS can implement the same functions.

The PC 12 also includes another USB device driver 281 corresponding to the USB device 14.

Figure 4:
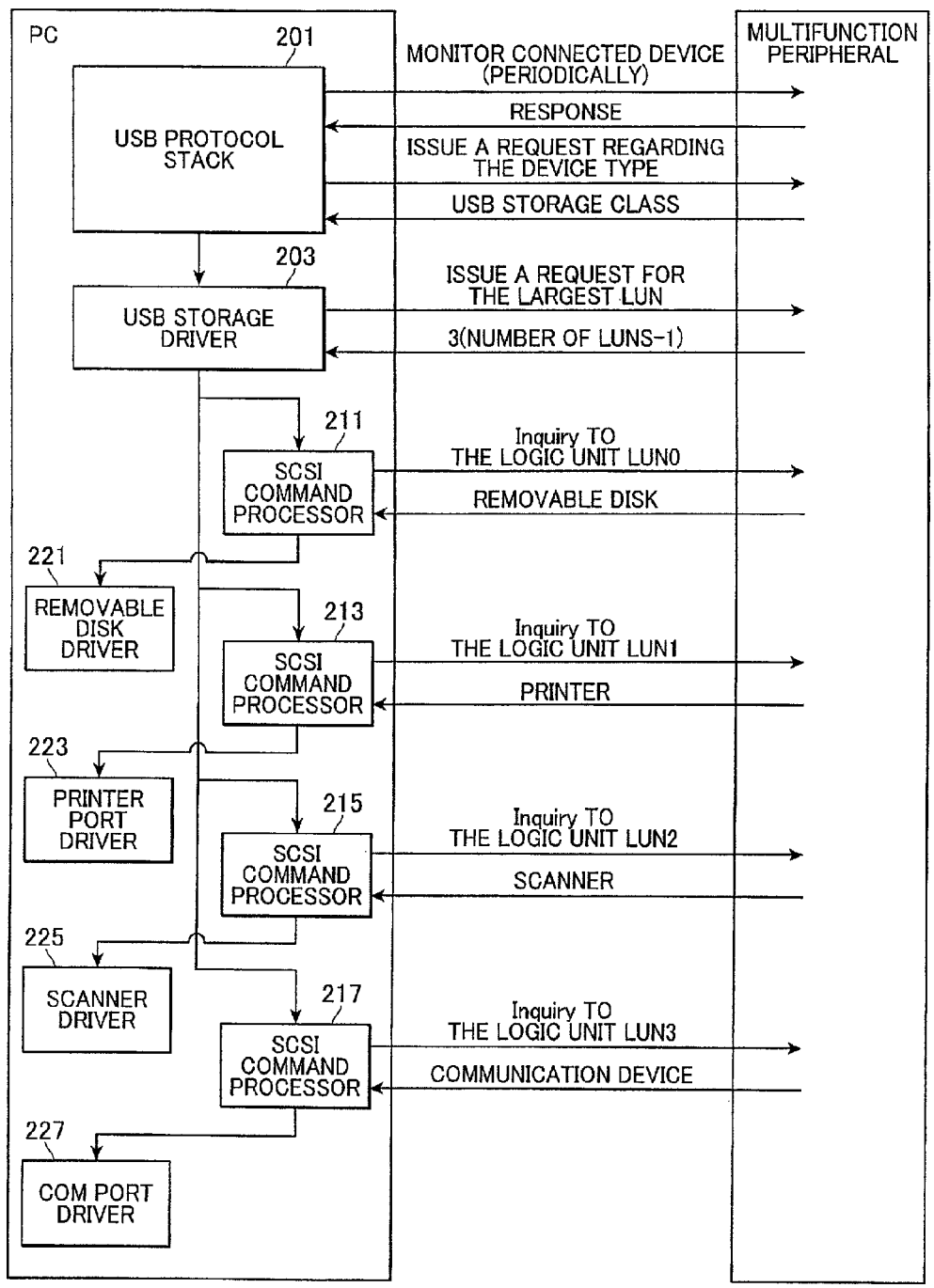
FIG. 4 is an explanatory diagram showing data exchanged when establishing a connection between the PC and multifunction peripheral.

With this construction, the USB protocol stack 201 begins functioning when the PC 12 is started and, thereafter, periodically monitors whether a USB device is connected to the PC 12, as illustrated in FIG. 4.

Since the multifunction peripheral 11 returns a response to the PC 12 when the multifunction peripheral 11 is connected to the PC 12, the USB protocol stack 201 issues a request to the multifunction peripheral 11 for a response regarding the device type. Upon receiving this request, the multifunction peripheral 11 returns a response indicating that the multifunction peripheral 11 is a USB storage class device. Accordingly, the PC 12 loads the USB storage driver 203 so that the USB storage driver 203 is running in the background.

When started, the USB storage driver 203 issues a request to the multifunction peripheral 11 for the largest LUN. Upon receiving this request, the multifunction peripheral 11 returns the largest LUN (LUN3 in this example). Consequently, the PC 12 determines that there is four logic units corresponding to the LUN0 through LUN3 and creates the four SCSI command processors 211, 213, 215 and 217 corresponding to the LUN0 through LUN3. The SCSI command processors 211 through 217 serve as ports for transferring SCSI commands to the multifunction peripheral 11 via the USB storage driver 203.

When created, the SCSI command processor 211 issues a SCSI command "Inquiry" to the logic unit LUN0. Upon receiving this inquiry, the multifunction peripheral 11 returns a response indicating that the device type is a removable disk. Accordingly, the PC 12 loads the removable disk driver 221.

In this way, the logic unit corresponding to LUN0 is linked to the file system 231 and, consequently, a drive letter is assigned to the logic unit LUN0. Thereafter, the logic unit LUN0 can be accessed by specifying this drive letter. The multifunction peripheral 11 is configured so that the logic unit corresponding to LUN0 is under the control of the memory slot I/O control task 121.

The SCSI command processors 213-217 perform similar processes to the SCSI command processor 211 described above. Specifically, the SCSI command processor 213 issues a SCSI command "Inquiry" to the LUN1 logic unit. Upon receiving this inquiry, the multifunction peripheral 11 returns a response indicating the device type is a printer. Accordingly, the PC 12 loads the printer port driver 223.

When performing an actual printing operation, the printer port driver 223 links to the printer driver 261, configuring a system for transmitting print data from the PC 12 to the multifunction peripheral 11. The logic unit for LUN1 in the multifunction peripheral 11 operates under control of the printer I/O task 151.

Similarly, the SCSI command processor 215 issues the SCSI command "Inquiry" to the LUN2 logic unit. Upon receiving this inquiry, the multifunction peripheral 11 returns a response indicating that the device type is a scanner. Accordingly, the PC 12 loads the scanner driver 225. The logic unit corresponding to LUN2 in the multifunction peripheral 11 operates under control of the scanner I/O task 153.

Further, the SCSI command processor 217 issues the SCSI command "Inquiry" to the LUN3 logic unit. Upon receiving this inquiry, the multifunction peripheral 11 returns a response indicating that the device type is a communication device. Accordingly, the PC 12 loads the COM port driver 227. The logic unit corresponding to LUN3 in the multifunction peripheral 11 operates under control of the PC-FAX I/O task 155.

After loading the respective drivers in the above procedure, the device drivers are in a state capable of implementing data transfers with the corresponding logic units via the SCSI command processors 213-217 according to the SCSI standard.

This is because the USB standard prescribes that, in a USB storage class device having a plurality of LUNs, data transfers between the logic units are performed according to a SCSI-compliant method. In other words, according to the USB standard, data transfers for a USB storage class device having a plurality of LUNs are performed internally according to a SCSI-compliant method, and this data transmission method is compliant with the USB standard.

When transferring data according to this method, each device driver and a corresponding logic unit in the multifunction peripheral 11 exchanges data according to a SCSI-compliant method, without realizing whether the communication protocol is compliant with the USB standard.

On the other hand, while the OS of the PC 12 prepares logic communication paths for transferring data according to the SCSI standard by using the USB-compliant communication protocol, the OS is not aware of the type of data being transmitted over the logical communication paths. Accordingly, any type of data can be transmitted over the communication paths prepared by the OS, provided that the transmission method is SCSI compliant, even when the data corresponds to a device other than a data storage system.

In the embodiment, the properties of these communication paths are used to transfer data according to a SCSI-compliant method to any of the four logic units having the printer function, scanner function, PC-FAX function, and card reader function, respectively.

More specifically, all of the drivers used to transfer data between the multifunction peripheral 11 via the SCSI command processors 213-217 (the printer port driver 223, scanner driver 225, and COM port driver 227) are SCSI-compliant drivers. The logic units in the multifunction peripheral 11 can be controlled according to a SCSI-compliant method.

With this configuration, each driver can control a function for a corresponding logic unit (printer function, scanner function, PC-FAX function, and card reader function) according to a SCSI-compliant method, without being conscious of the USB standard. Further, various data can be transferred internally between each driver and a corresponding logic unit according to a SCSI-compliant method, resulting in the data being transferred according to a USB-compliant method.

Further, for a USB storage class device having a plurality of LUNs, the multifunction peripheral 11 need only be provided with one each of an input endpoint EP1 and an output endpoint EP2 in order to transfer data between each logic unit. Such a device differs greatly from a USB compound device, even when operating according to the same USB standard.

That is, with a USB compound device, it is necessary to provide one each of an input data endpoint and an output data endpoint for each function, thereby making the total number of input and output endpoints equivalent to two times the number of functions. However, with the configuration of the multifunction peripheral 11 described above, the total number of input and output data endpoints is "2", regardless of the number of functions.

After each driver is prepared on the PC 12 according to the above procedure, the PC 12 can access a memory card mounted in any of the first through fourth memory slots 131-134 using the drive letter corresponding to the LUN0 logic unit.

For example, if the user performs an operation using the Explorer 277 on a file in a memory card mounted in the first memory slot 131, the Explorer 277 transfers a command to the multifunction peripheral 11 via the file system 231, removable disk driver 221, SCSI command processor 211, USB storage driver 203, and USB protocol stack 201.

The multifunction peripheral 11 then returns a response to the Explorer 277 via the USB protocol stack 201, USB storage driver 203, SCSI command processor 211, removable disk driver 221, and file system 231.

Print data outputted from the printer application 271 is transferred to the printer port driver 223 via the printer driver 261. The printer port driver 223 issues a command for outputting print data to a SCSI-compliant printer device, whereby print data is transferred to the SCSI command processor 213 and in turn transferred to the multifunction peripheral 11 via the USB storage driver 203 and USB protocol stack 201.

Similarly, scanner control data and the like outputted from the scanner application 273 is transferred to the multifunction peripheral 11 via the scanner driver 225, SCSI command processor 215, USB storage driver 203, and USB protocol stack 201. Further, facsimile transmission data, control data, and the like outputted from the PC-FAX application 275 are transferred to the multifunction peripheral 11 via the COM port driver 227, SCSI command processor 217, USB storage driver 203, and USB protocol stack 201.

In some cases, the multifunction peripheral 11 transfers input data to the PC 12 as a result of the various data transferred above. For example, if scanner control data is transferred to the multifunction peripheral 11, the multifunction peripheral 11 activates the scanner function, which transfers scan data from the multifunction peripheral 11 as a result.

When scan data, for example, is transferred to the PC 12, the data is transferred to the scanner application 273 via the USB protocol stack 201, USB storage driver 203, SCSI command processor 215, and scanner driver 225.

Status data for the printer function, such as data related to a print error or the like, is transferred to the printer application 271 via the USB protocol stack 201, USB storage driver 203, SCSI command processor 213, printer port driver 223, and printer driver 261.

Facsimile reception data received by the PC-FAX function is transferred to a PC-FAX application 275 via the USB protocol stack 201, USB storage driver 203, SCSI command processor 217, and COM port driver 227.

Process for Installing Multifunction Peripheral Software

Next, a process for installing multifunction peripheral software on the PC 12, enabling the PC 12 to use the multifunction peripheral 11 having the above construction will be described with reference to the flowchart in FIG. 5.

Figure 5:
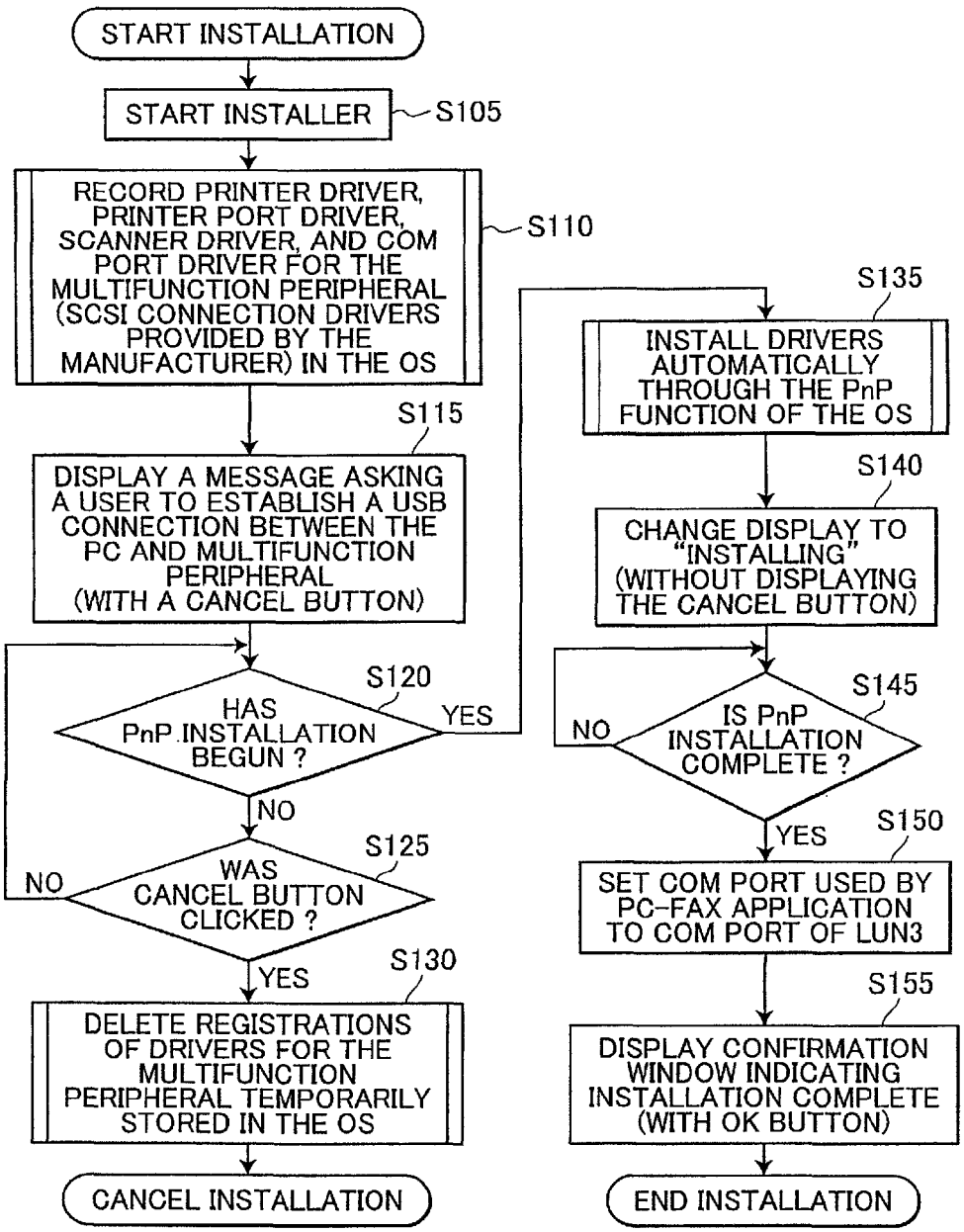
FIG. 5 is a flowchart illustrating steps in an installation process executed by the PC for installing multifunction peripheral software.

In S105 at the beginning of the process shown in FIG. 5, the PC 12 launches an installer. This process may be executed when the user performs a prescribed operation or may be executed automatically when a CD-ROM or other medium is inserted into a CD-ROM drive or the like.

In S110 the PC 12 registers the printer driver, printer port driver, scanner driver, and COM port driver for the multifunction peripheral in the OS. Each driver recorded in the OS in S110 is SCSI connection software supplied by the manufacturer of the multifunction peripheral 11. In S110 the PC 12 uses a function of the OS (the Plug-and-Play (PnP) installation function described later) to record in the OS data required for installing each driver.

In S115 the PC 12 displays a message on a display unit of the PC 12 asking the user to establish a USB connection between the PC 12 and multifunction peripheral 11. A Cancel button is also displayed with this message on the display unit.

After displaying the message, in S120 the PC 12 monitors whether a function of the OS has begun the PnP installation. If the PnP installation has not begun (S120: NO), in S125 the PC 12 determines whether the Cancel button has been pressed. If the Cancel button has not been pressed (S125: NO), the PC 12 returns to S120.

While the above process is looping between S120 and S125, the user can perform an operation to select the Cancel button, for example, click on the Cancel button displayed in the display unit with a pointing device. If the user selects the Cancel button (S125: YES), in S130 the PC 12 deletes the temporarily recorded drivers for the multifunction peripheral from the OS and cancels the installation process.

However, if the PnP installation begins while the PC 12 is looping between S120 and S125 (S120: YES), then it is known that a USB connection has been established between the PC 12 and multifunction peripheral 11. In this case, the drivers are automatically installed through the PnP function of the OS in S135.

Therefore, in S140 the PC 12 changes the message on the display unit to "Installing." At this stage, various data required for integrating the drivers is already being sequentially recorded. Therefore, the Cancel button and the like are not displayed in the display unit, preventing the user from canceling the operation.

In S145 the PC 12 waits until the PnP installation is complete. While the process has not completed (S145: NO), the PC 12 continually loops back to S145. However, when the PnP installation is complete (S145: YES), in S150 the PC 12 sets the COM port used by the PC-FAX application to the COM port of LUN3.

Specifically, in the process executed in S150 the PC 12 assigns the PC-FAX application 275 to the COM port that newly appeared on the PC 12 while the COM port driver 227 was installed. Thereafter, the PC-FAX application 275 recognizes this COM port as the COM port to use among all existing COM ports in the PC 12.

In S155 the PC 12 displays a confirmation window indicating that installation is complete. At this time, an OK button is displayed in the display unit of the PC 12 along with the confirmation window, enabling the user to perform an operation to select the OK button. When the user selects the OK button, the PC 12 ends the installation process.

An Example Process Executed on the PC when the Power is on

Next, an example process executed on the PC from the moment the PC is turned on until the moment the PC is turned off will be described with reference to FIGS. 6 through 8. The following description covers the case in which the power switch of the PC 12 is turned on, while the power switch of the multifunction peripheral 11 is already on.

Figure 6:
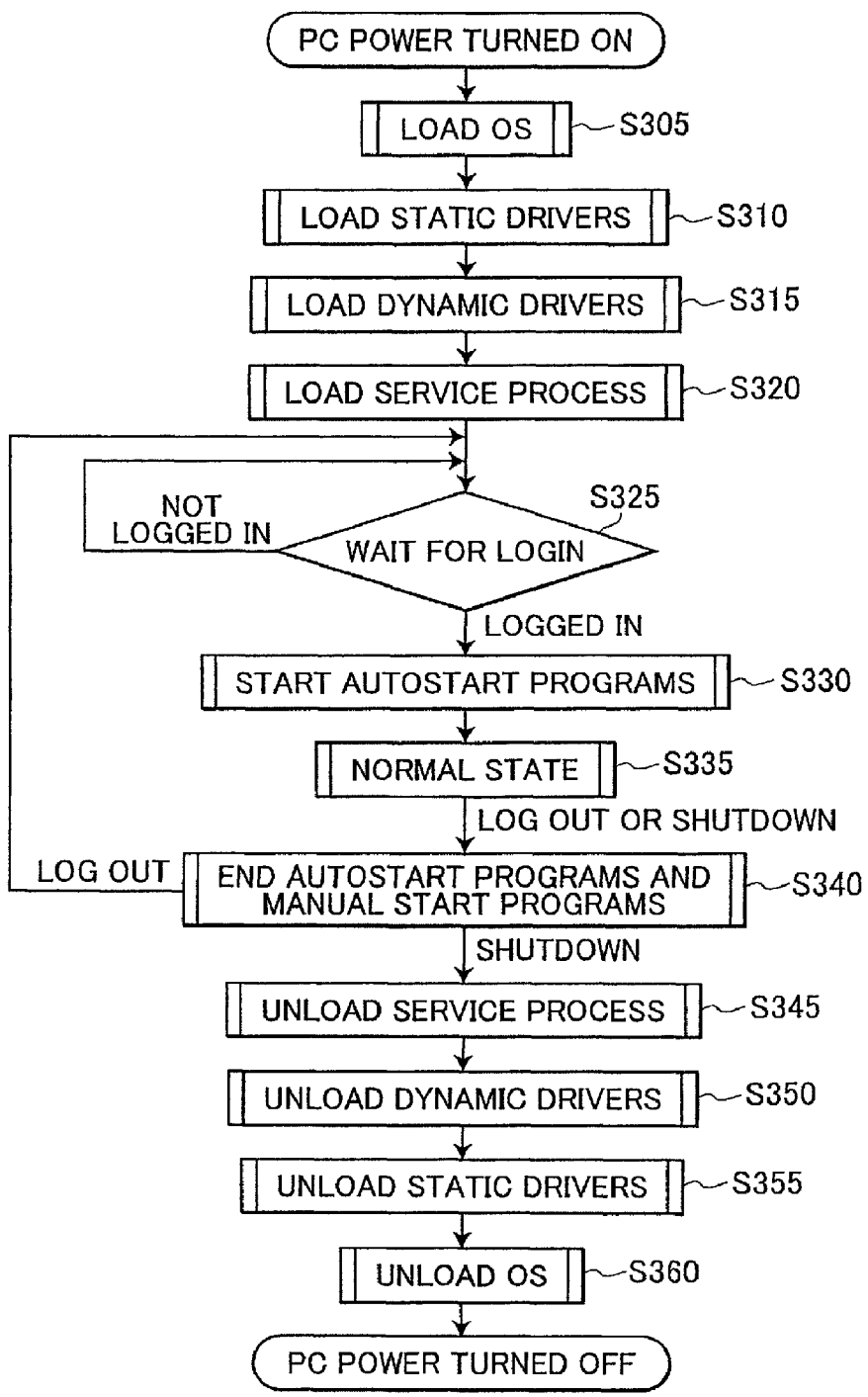

When the power switch of the PC 12 is turned on, first the PC 12 loads the OS in S305 of FIG. 6. In S310 the PC 12 loads static drivers. This process of S310 will be described in greater detail next with reference to FIG. 7.

Figure 7:
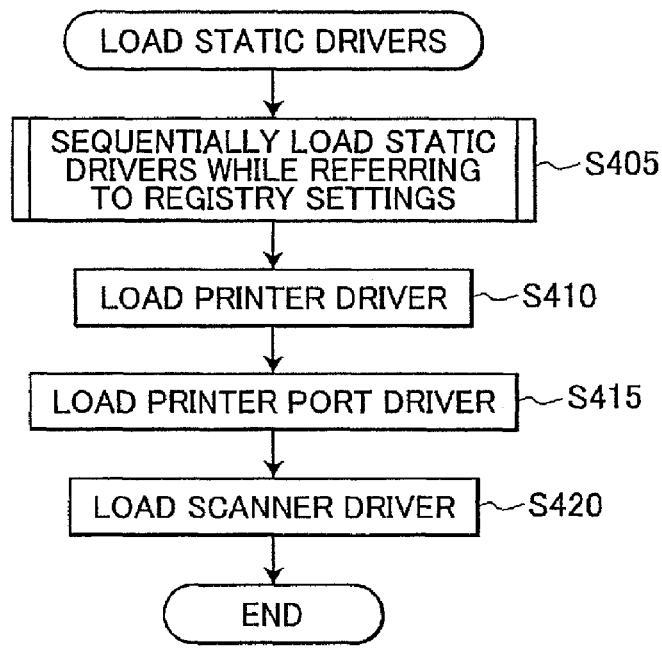
FIG. 7 is a flowchart illustrating steps in a process executed on the PC for loading static drivers.

As shown in FIG. 7, in S405 the OS of the PC 12 sequentially loads static drivers while referencing registry settings. Subsequently, the PC 12 loads a printer driver in S410, loads a printer port driver in S415, and loads a scanner driver in S420. After loading these drivers, the process in FIG. 7 ends.

The process in S310 of FIG. 6 is completed after completing the process shown in FIG. 7. Next, in S315 the PC 12 loads dynamic drivers. The process of S315 will be described next in detail with reference to FIG. 8.

Figure 8:
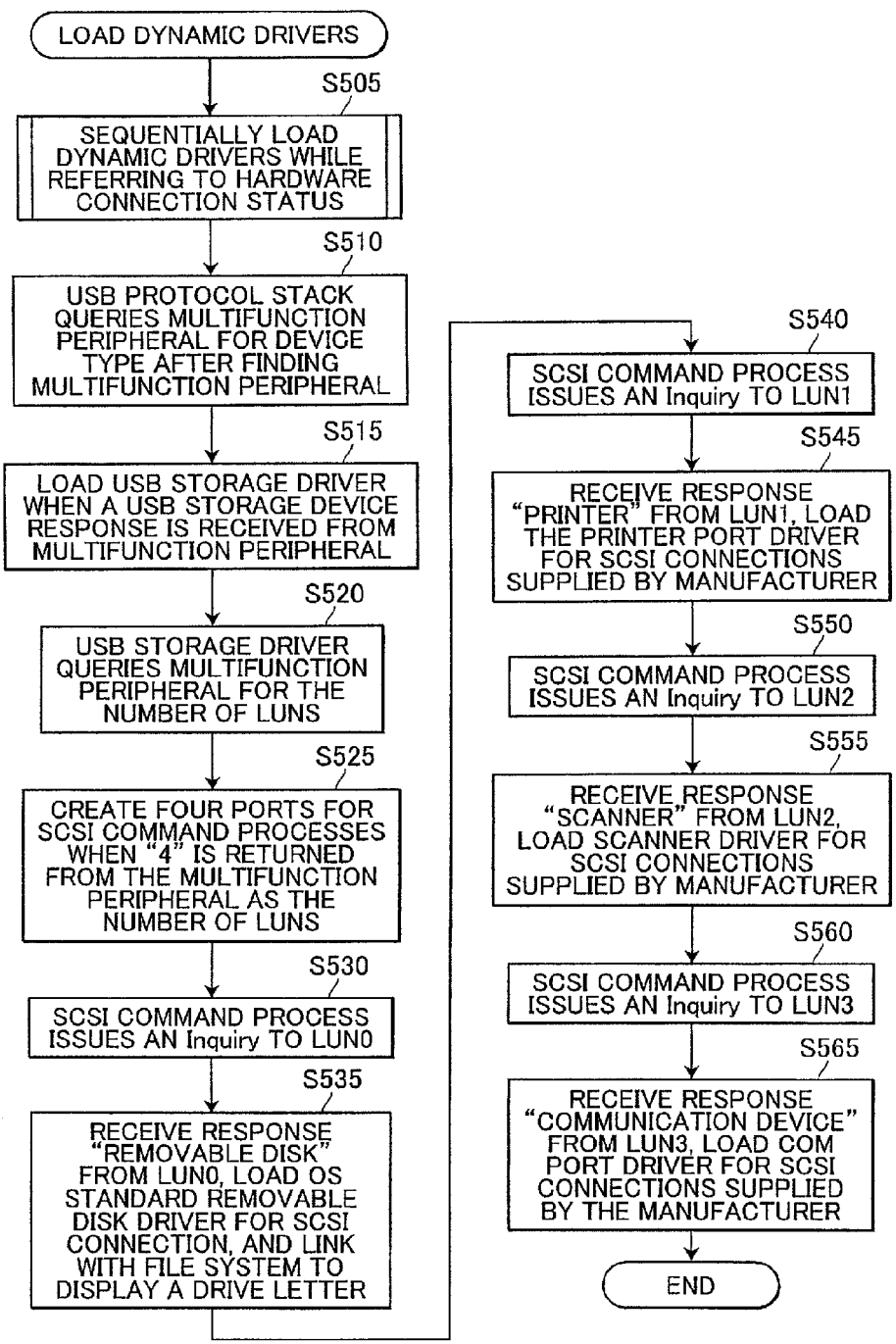
FIG. 8 is a flowchart illustrating steps in a process executed on the PC for loading dynamic drivers.

Specifically, in S505 of FIG. 8, the OS of the PC 12 sequentially loads dynamic drivers while referencing the status of hardware connections. In S510 the PC 12 queries the device type of the multifunction peripheral 11 after the USB protocol stack 201 has found the multifunction peripheral 11.

If there is a response to this query from the multifunction peripheral 11 indicating that the multifunction peripheral 11 is a USB storage device, in S515 the PC 12 loads the USB storage driver 203.

Since the USB storage driver 203 is put in a functioning state through the process of S515, in S520 the USB storage driver 203 queries the multifunction peripheral 11 for the number of LUNs. More specifically, in S520 the USB storage driver 203 issues an inquiry for the largest LUN.

In the case of the embodiment, the multifunction peripheral 11 has four logic units. Since a series of numbers are assigned to the logic units with the smallest LUN being "0", the multifunction peripheral 11 returns "3" as the largest LUN.

The PC 12 determines that the multifunction peripheral 11 has four LUNs based on the response of "3" for the largest LUN. In this case, in S525 the PC 12 creates four ports for the SCSI command process. Through the process of S525, the SCSI command processors 211 through 217 are configured.

After the SCSI command processors 211 through 217 are in a functioning state, in S530 the SCSI command processor 211 issues an "Inquiry" to the logic unit LUN0.

In response to this inquiry, in S535 the PC 12 receives the response "removable disk" from the logic unit LUN0 in the embodiment. In this case, the PC 12 loads the OS standard removable disk driver 221 for SCSI connections and links the removable disk driver 221 with the file system 231, causing a drive letter to be assigned to the logic unit LUN0 and appear in Explorer 277. The removable disk driver 221 is provided as a standard function of the OS for SCSI connections and used to establish a USB connection between the PC 12 and a USB storage device. Therefore, it is not necessary for the manufacture of the multifunction peripheral 11 to provide the removable disk driver 221 (SCSI driver for the multifunction peripheral 11) to the user.

In S540 the SCSI command processor 213 issues an "Inquiry" to the logic unit LUN1. In response to this inquiry, the PC 12 receives the response "printer" from the logic unit LUN1. In this case, in S545 the PC 12 loads the printer port driver 223 for SCSI connections supplied by the manufacturer. When an actual printing operation is performed, the printer port driver 223 links to the printer driver 261. Since the printer port driver 223 is not provided as a standard function of the OS on the PC 12, the printer port driver 223 (SCSI connection driver for the multifunction peripheral 11) must be provided by the manufacturer of the multifunction peripheral 11 to the user.

In S550 the SCSI command processor 215 issues an "Inquiry" to the logic unit LUN2. In response to this inquiry, the PC 12 receives the response "scanner" from the logic unit LUN2. In S555 the PC 12 loads the scanner driver 225 for SCSI connections supplied by the manufacturer. Since the scanner driver 225 is also not provided standard in the OS of the PC 12, the scanner driver 225 (SCSI connection driver for the multifunction peripheral 11) must be provided by the manufacturer of the multifunction peripheral 11 to the user.

In S560 the SCSI command processor 217 issues an "Inquiry" to the logic unit LUN3. In response to this inquiry, the PC 12 receives the response "communication device" from the logic unit LUN3. In S565 the PC 12 loads the COM port driver 227 for SCSI connections supplied by the manufacturer. Since the COM port driver 227 is also not provided standard in the OS of the PC 12, the COM port driver 227 (SCSI connection driver for the multifunction peripheral 11) must be provided by the manufacturer of the multifunction peripheral 11 to the user.

The process in S315 of FIG. 6 ends after completing the process for loading dynamic drivers described in FIG. 8. Next, in S320 the PC 12 loads a service process, and in S325 waits for login data.

Specifically, the PC 12 waits in S325 until the user has completed a login operation (S325: not logged in). After the user has completed the login process (S325: logged in), in S330 the PC 12 launches autostart programs. The OS of the PC 12 sequentially launches autostart programs while referencing programs listed in the Start Up in the Start Menu in S330.

After completing S330 by launching the autostart programs, in S355 the PC 12 enters a normal state. Once the PC 12 has arrived at this normal state, the user can use the printer application 271, scanner application 273, PC-FAX application 275, Explorer 277, and the like as desired.

If the user subsequently performs an operation to log out or to shutdown the PC 12 (S335: log out or shutdown), in S340 the PC 12 first stops all the programs started automatically and manually and, in the case of a logout operation (S340: logout), returns to S325.

However, in the case of a shutdown operation (S340: shutdown), in S345 the PC 12 unloads the service process, in S350 unloads the dynamic drivers, and in S355 unloads the static drivers. Lastly, in S360 the PC 12 unloads the OS and shuts off the power to the PC 12. The process in S345-S360 unloads all software in the reverse order of the process in S305-S320.

Process Executed with the SCSI Command Analysis Task

Figure 9:
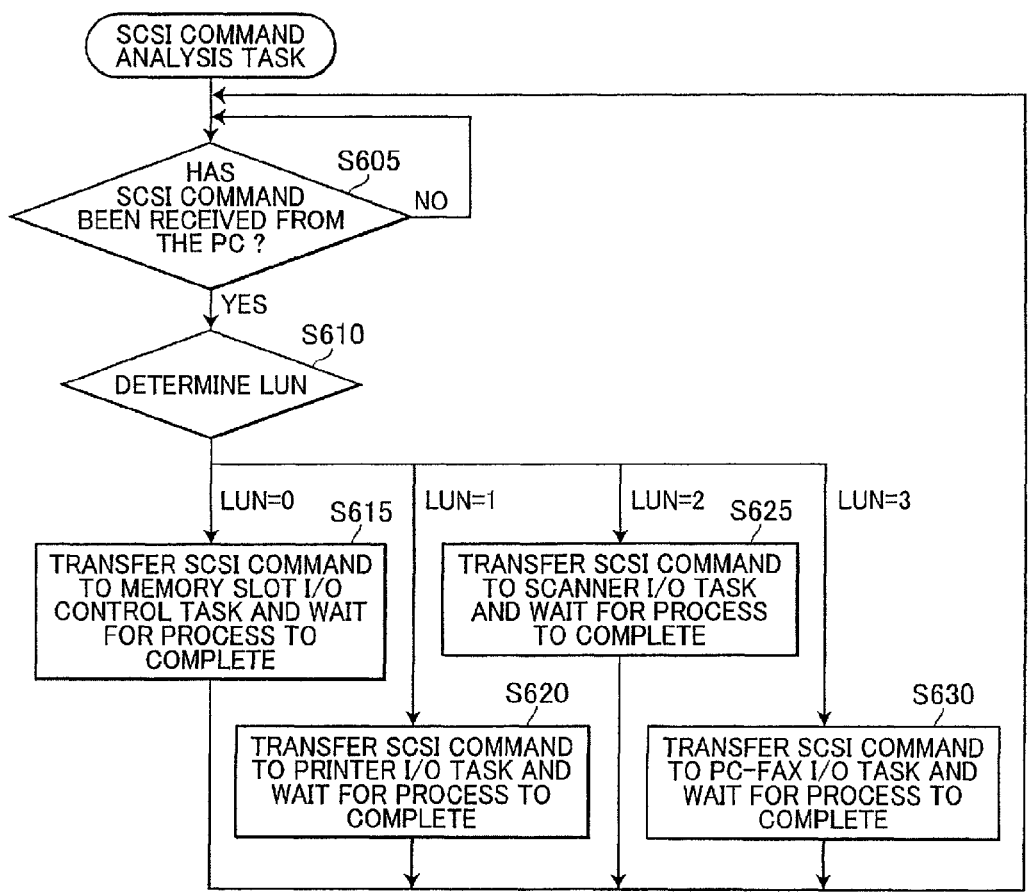
FIG. 9 is a flowchart illustrating steps in a process executed with a SCSI command analysis task implemented on the multifunction peripheral.

Next, the process executed by the SCSI command analysis task 111 provided in the multifunction peripheral 11 will be described with reference to FIG. 9.

In S605 at the beginning of this process, the SCSI command analysis task 111 determines whether a SCSI command is transferred from the PC 12. The SCSI command analysis task 111 repeatedly loops back to S605 while a SCSI command has not been received from the PC 12 (S605: NO).

When a SCSI command is transferred from the PC 12 (S605: YES), in S610 the SCSI command analysis task 111 determines which one of "0" through "3" the LUN specified in the SCSI command is.

If the LUN is "0" (S610: LUN=0) in S610, the SCSI command analysis task 111 redirects the SCSI command to the memory slot I/O control task 121, and in S615 waits for the process performed with the memory slot I/O control task 121 to end.

In the process of S615, the SCSI command analysis task 111 transfers the SCSI command to the memory slot I/O control task 121. After transferring the SCSI command to the memory slot I/O control task 121, the SCSI command analysis task 111 waits for the process performed with the memory slot I/O control task 121 to end.

After the process with the memory slot I/O control task 121 ends, the SCSI command analysis task 111 receives a response from the memory slot I/O control task 121, returns the response as a response to the SCSI command to the PC 12, and ends the process in S615. After completing the process in S615, the SCSI command analysis task 111 returns to S605.

Here, a specific example will be given for the process in S615. In this example, the PC 12 transfers a SCSI command to the multifunction peripheral 11 requesting to write data to media (a memory card in the embodiment). In S615 the SCSI command analysis task 111 transfers the received SCSI command to the memory slot I/O control task 121.

At this time, the memory slot I/O control task 121 executes a process to write the target data to the media and subsequently returns data indicating the results of the writing operation to the SCSI command analysis task 111 as a response.

During the process of S615, the SCSI command analysis task 111 waits until the memory slot I/O control task 121 completes the operation. After receiving a response from the memory slot I/O control task 121, the SCSI command analysis task 111 returns this response to the PC 12 as a response to the SCSI command, and subsequently ends the process in S615.

As another example, the PC 12 may transfer a SCSI command to the multifunction peripheral 11 requesting to read data from media. In this case, in S615 the SCSI command analysis task 111 transfers the received SCSI command to the memory slot I/O control task 121.

At this time, the memory slot I/O control task 121 executes a process to read the target data from the media and subsequently returns data indicating the results of the reading operation, as well as the read data, to the SCSI command analysis task 111 as a response.

During the process of S615, the SCSI command analysis task 111 waits until the memory slot I/O control task 121 completes the operation. After receiving a response from the memory slot I/O control task 121, the SCSI command analysis task 111 returns this response to the PC 12 as a response to the SCSI command, and subsequently ends the process in S615.

If any of the other various SCSI commands are received by the multifunction peripheral 11, in S615 the SCSI command analysis task 111 transfers the command to the memory slot I/O control task 121 and subsequently transfers the response returned from the memory slot I/O control task 121 to the PC 12.

Since there are a variety of SCSI commands that can be transferred from the PC 12 to the memory slot I/O control task 121, as described above, the details of the processes executed with the memory slot I/O control task 121 also vary widely according to the SCSI command. However, since the processes executed with the memory slot I/O control task 121 are identical to processes well known in the art executed on a conventional device having a data storage function, a description of these processes will not be included herein.

On the other hand, if the multifunction peripheral 11 determines in S610 that the LUN is "1" (S610: LUN=1), then in S620 the multifunction peripheral 11 transfers the SCSI command to the printer I/O task 151 and waits for the process performed with the printer I/O task 151 to end.

Specifically, in S620 the multifunction peripheral 11 transfers the SCSI command received from the PC 12 from the SCSI command analysis task 111 to the printer I/O task 151. After transferring the SCSI command to the printer I/O task 151, the SCSI command analysis task 111 waits for the process performed with the printer I/O task 151 to end.

After the process with the printer I/O task 151 ends, the SCSI command analysis task 111 receives a response from the printer I/O task 151, returns the response to the PC 12 as a response to the SCSI command, and ends the process in S620. After completing the process in S620, the SCSI command analysis task 111 returns to S605.

Here, a specific example will be given for the process in S620. In this example, the PC 12 transfers a SCSI command to the multifunction peripheral 11 requesting to output print data. In S620 the SCSI command analysis task 111 transfers the received SCSI command to the printer I/O task 151.

At this time, the printer I/O task 151 transfers data and the like to the printer control task 161, and the printer control task 161 controls the operation of the printer hardware 171 to perform a printing operation on a recording medium, for example. When the printer I/O task 151 becomes ready to receive the next print data, a response indicating this state is returned from the printer I/O task 151 to the SCSI command analysis task 111.

During the process of S620, the SCSI command analysis task 111 waits until the printer I/O task 151 completes the operation. After receiving a response from the printer I/O task 151, the SCSI command analysis task 111 returns this response to the PC 12 as a response to the SCSI command, and subsequently ends the process in S620.

There are a variety of SCSI commands that the PC 12 may transfer to the printer I/O task 151, including a command to acquire the printer status, for example. Details of processes executed by the printer I/O task 151 and printer control task 161 depend on the SCSI command. However, since the processes executed by the printer I/O task 151 and printer control task 161 are well known processes for conventional devices having a printer function, these processes will not be described herein.

Further, if the multifunction peripheral 11 determines in S610 that the LUN is "2" (S610: LUN=2), in S625 the multifunction peripheral 11 transfers the SCSI command to the scanner I/O task 153 and waits for the process with the scanner I/O task 153 to end.

Specifically, in S625 the SCSI command analysis task 111 transfers the SCSI command received from the PC 12 to the scanner I/O task 153. After transferring the SCSI command to the scanner I/O task 153, the SCSI command analysis task 111 waits for the process performed with the scanner I/O task 153 to end.

After the process with the scanner I/O task 153 ends, the SCSI command analysis task 111 receives a response from the scanner I/O task 153, returns this response to the PC 12 as a response to the SCSI command, and ends the process in S625. After completing the process in S625, the SCSI command analysis task 111 returns to S605.

Here, a specific example will be given for the process in S625. In this example, the PC 12 transfers a SCSI command to the multifunction peripheral 11 requesting scanner input. In S625 the SCSI command analysis task 111 transfers the received SCSI command to the scanner I/O task 153.

At this time, the scanner I/O task 153 transfers data and the like to the scanner control task 163, and the scanner control task 163 controls operations of the scanner hardware 173 for inputting image data from an original document. Subsequently, the scanner I/O task 153 returns this image data and the like to the SCSI command analysis task 111.

During the process of S625, the SCSI command analysis task 111 waits until the scanner I/O task 153 completes the process. After receiving a response from the scanner I/O task 153, the SCSI command analysis task 111 returns this response to the PC 12 as a response to the SCSI command, and subsequently ends the process in S625.

There are a wide variety of SCSI commands that the PC 12 can transfer to the scanner I/O task 153, including a command for acquiring the scanner status, for example. Accordingly, details of these processes executed by the scanner I/O task 153 and scanner control task 163 vary according to the SCSI command. However, since the processes executed with the scanner I/O task 153 and scanner control task 163 are identical to the processes well known in the art for conventional devices having a scanner function, a description of these processes will not be given herein.

Further, if the multifunction peripheral 11 determines in S610 that the LUN is "3" (S610: LUN=3), then in S630 the multifunction peripheral 11 transfers the SCSI command to the PC-FAX I/O task 155 and waits for the process with the PC-FAX I/O task 155 to end.

Specifically, in S630 the SCSI command analysis task 111 transfers the SCSI command received from the PC 12 to the PC-FAX I/O task 155. After transferring the SCSI command to the PC-FAX I/O task 155, the SCSI command analysis task 111 waits for the process performed with the PC-FAX I/O task 155 to end.

After the process with the PC-FAX I/O task 155 ends, the SCSI command analysis task 111 receives a response from the PC-FAX I/O task 155, returns this response to the PC 12 as a response to the SCSI command, and ends the process in S630. After completing the process in S630, the SCSI command analysis task 111 returns to S605.

Here, a specific example will be given for the process in S630. In this example, the PC 12 transfers a SCSI command to the multifunction peripheral 11 requesting to transmit facsimile data. In S630 the SCSI command analysis task 111 transfers the received SCSI command to the PC-FAX I/O task 155.

At this time, the PC-FAX I/O task 155 transfers data and the like to the modem control task 165, and the modem control task 165 controls operations of the modem hardware 175 to execute a fax transmission process and the like. When the PC-FAX I/O task 155 becomes ready to receive subsequent fax transmission data, a response indicating this status is returned to the SCSI command analysis task 111.

During the process of S630, the SCSI command analysis task 111 waits until the PC-FAX I/O task 155 completes the process. After receiving a response from the PC-FAX I/O task 155, the SCSI command analysis task 111 returns this response to the PC 12 as a response to the SCSI command, and subsequently ends the process in S630.

As another example, the PC 12 may transfer a SCSI command to the multifunction peripheral 11 requesting to receive facsimile data. In this case, in S630 the SCSI command analysis task 111 transfers the received SCSI command to the PC-FAX I/O task 155.

At this time, the PC-FAX I/O task 155 returns fax reception data and the like to the SCSI command analysis task 111 if such data is received. If fax reception data is not received, the PC-FAX I/O task 155 returns data to the SCSI command analysis task 111 indicating that no fax reception data was received.

During the process of S630, the SCSI command analysis task 111 waits until the PC-FAX I/O task 155 completes the process. After receiving a response from the PC-FAX I/O task 155, the SCSI command analysis task 111 returns this response to the PC 12 as a response to the SCSI command, and subsequently ends the process in S630.

There are a wide variety of SCSI commands that the PC 12 can transfer to the PC-FAX I/O task 155, including a command for acquiring the modem status, for example. Accordingly, details of these processes executed with the PC-FAX I/O task 155 and modem control task 165 vary according to the SCSI command. However, since the processes executed with the PC-FAX I/O task 155 and modem control task 165 are identical to the processes well known in the art for conventional devices having a PC-FAX function, a description of these processes will not be given herein.

Effects of the First Embodiment

With the first embodiment described above, the multifunction peripheral 11 can force the OS of the PC 12 to recognize the multifunction peripheral 11 as a USB storage class device having a plurality of LUNs. The PC 12 has a single USB storage driver 203 for the multifunction peripheral 11. According to the USB communication protocol, when output data (packets) from the PC 12 is transferred to the multifunction peripheral 11, this output data includes data which specifies one of the plurality of LUNs. Hence, data can be transferred between the PC 12 and the logic unit according to the USB communication protocol. Specifically, by assigning a plurality of different functions (printer function, scanner function, PC-FAX function, and data storage function) to logic units corresponding to the plurality of LUNs, the PC 12 can control the logic units having different functions by specifying the corresponding LUNs.

Moreover, the multifunction peripheral 11 need only be provided with one each of an input and output endpoint corresponding to all of the plurality of LUNs in order to perform data transfers according to the above method. Hence, unlike a USB compound device having input and output endpoints corresponding to each function, the multifunction peripheral 11 need only have one each of an input endpoint and an output endpoint for all of these functions, thereby reducing the number of endpoints required.

Therefore, it is not necessary to create a pseudo condition in which one USB device must be disconnected before establishing a connection with another USB device. Hence, the OS of the PC 12 can simultaneously use the plurality of functions without requiring time to switch device drivers.

Further, since the endpoint for control transfers (EP0) is not used for transferring other data, required control can be promptly implemented without interference from other data transfers, even when a large amount of data is being transferred.

(2) Second Embodiment

Next, a second embodiment of the present invention will be described. Since the structure of the second embodiment differs only in part from the first embodiment described above, the following description will focus primarily on the differences with the first embodiment, while a description of the common structure will be omitted.

Internal Structure of the PC

Figure 10:
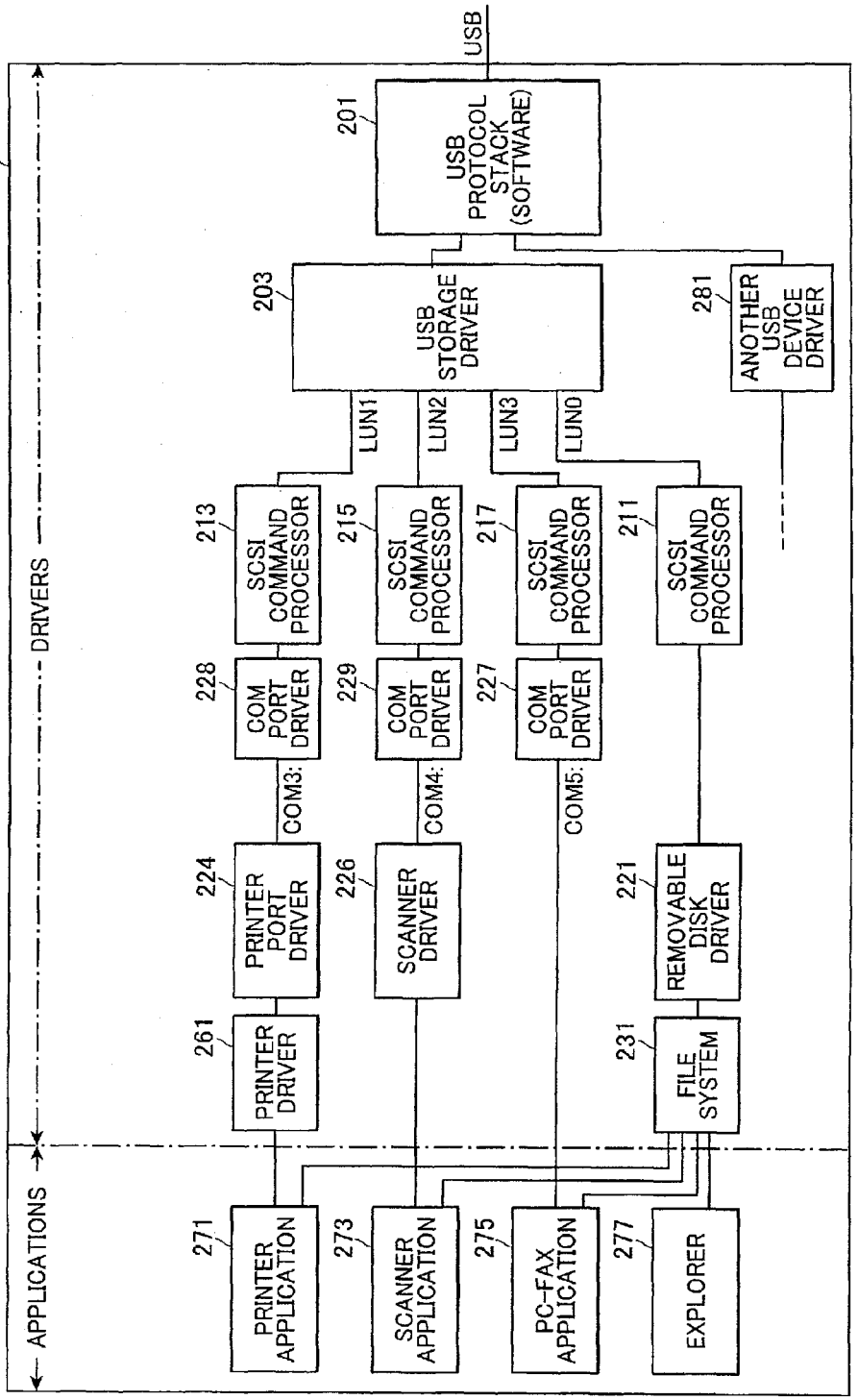
FIG. 10 is a block diagram showing the internal structure of a PC according to a second embodiment.

FIG. 10 is a block diagram showing the internal structure of a PC 22 according to the second embodiment. In the PC 12 according to the first embodiment described above, all of the printer port driver 223, scanner driver 225, and COM port driver 227 are SCSI-compliant device drivers. However, the structure of the second embodiment differs on this point.

Specifically, a printer port driver 224 and a scanner driver 226 in the second embodiment are device drivers which are not compliant with SCSI. It is impossible to implement SCSI-compliant data transfers via the SCSI command processors 213 and 215 by using those device drivers 224 and 226 only.

Therefore, the printer port driver 224 and scanner driver 226 in the second embodiment exchange data with the multifunction peripheral 11 via SCSI-compliant COM port drivers 228 and 229.

With this configuration, when the printer port driver 224 or scanner driver 226 transfers data to the multifunction peripheral 11, the corresponding COM port driver 228 or 229 stores this data in the actual data section of SCSI-compliant data and transfers this SCSI-compliant data to the multifunction peripheral 11.

Further, data to be transferred to the printer port driver 224 or scanner driver 226 is stored in the actual data section of SCSI-compliant data received from the multifunction peripheral 11. Accordingly, the corresponding COM port driver 228 or 229 receives this SCSI-compliant data and transfers the actual data section to the printer port driver 224 or scanner driver 226.

Accordingly, the printer port driver 224 and scanner driver 226 need not be SCSI-compliant devices, and the software in the multifunction peripheral 11 need not support the SCSI standard for the printer function and scanner function. Hence, it is possible to employ a unique standard, for example, for the group of software related to the printer function and scanner function, while employing a SCSI-compliant data transfer method for the data transfer paths.

Process for Installing Multifunction Peripheral Software

Next, a process performed by the PC 22 according to the second embodiment for installing multifunction peripheral software executed on the PC 22 will be described with reference to the flowchart in FIGS. 11 and 12.

In S705 at the beginning of the process shown in FIG. 11, the PC 22 launches an installer. In S710 the PC 22 registers the COM port drivers for the multifunction peripheral in the OS. The COM port drivers recorded in the OS in S710 are SCSI connection software supplied by the manufacturer of the multifunction peripheral 11. In S710 the PC 12 uses the PnP installation function of the OS to record in the OS data required for installing each driver. The installation process according to the second embodiment differs from the first embodiment in that the printer driver, printer port driver, and scanner driver are not recorded.

In S715 the PC 22 displays a message on a display unit of the PC 22 asking the user to establish a USB connection between the PC 22 and multifunction peripheral 11. A Cancel button is also displayed with this message on the display unit.

After displaying the message, in S720 the PC 22 monitors whether a function of the OS has begun the PnP installation. If the PnP installation has not begun (S720: NO), in S725 the PC 22 determines whether the Cancel button has been pressed. If the Cancel button has not been pressed (S725: NO), the PC 22 returns to S720.

While the above process is looping between S720 and S725, the user can perform an operation to select the Cancel button, for example, to click on the Cancel button displayed in the display unit with a pointing device. If the user selects the Cancel button (S725: YES), then in S730 the PC 22 deletes the temporarily recorded drivers for the multifunction peripheral from the OS and cancels the installation process.

However, if the PnP installation begins while the PC 22 is looping between S720 and S725 (S720: YES), then it is known that a USB connection has been established between the PC 22 and the multifunction peripheral 11. In this case, the drivers are automatically installed through the PnP function of the OS in S735.

Therefore, in S740 the PC 22 changes the message on the display unit to "Installing." At this stage, various data required for integrating the drivers is already being sequentially recorded. Therefore, the Cancel button and the like are not displayed in the display unit, preventing the user from canceling the operation. In S745 the PC 22 waits until the PnP installation is complete. While the process has not completed (S745: NO), the PC 22 continually loops back to S745.

However, when the PnP installation is complete (S745: YES), in S750 (FIG. 12) the PC 22 sets the COM port used by the printer driver to the COM port of LUN1. Since a printer port driver directly linking the printer driver to the COM port is included as a standard function of the OS, this function may be used. In S755 the PC 22 sets the COM port used by the scanner driver to the COM port of LUN2, and in S760 sets the COM port used by the PC-FAX application to the COM port for LUN3.

After completing the above processes, in S765 the PC 22 displays a confirmation window indicating that installation is complete. At this time, an OK button is displayed in the display unit of the PC 22 along with the confirmation window, enabling the user to perform an operation to select the OK button. When the user selects the OK button, the PC 22 ends the installation process.

Process for Loading Dynamic Drivers

Next, the process for loading dynamic drivers according to the second embodiment will be described with reference to FIG. 13 since this process differs slightly from the process according to the first embodiment shown in FIG. 8.

Specifically, in S805 of FIG. 13, the OS of the PC 22 sequentially loads dynamic drivers while referencing the status of hardware connections. In S810 the PC 22 performs a process of querying the multifunction peripheral 11 for the device type after the USB protocol stack 201 has found the multifunction peripheral 11.

When there is a response to this query from the multifunction peripheral 11 indicating that the multifunction peripheral 11 is a USB storage device, in S815 the PC 22 loads the USB storage driver 203.

Once the USB storage driver 203 is put in a functioning state through the process of S815, in S820 the USB storage driver 203 queries the multifunction peripheral 11 for the number of LUNs. More specifically, in S820 the USB storage driver 203 issues an inquiry for the largest LUN.

In the example of the embodiment, the multifunction peripheral 11 has four logic units. Since the smallest LUN assigned to these logic units is "0", the multifunction peripheral 11 returns a "3" as the largest LUN.

When a "3" is returned as the largest LUN, in S825 the PC 22 determines that the multifunction peripheral 11 has four LUNs based on this response and creates four ports for the SCSI command processes. Through the process of S825, the SCSI command processors 211-217 are configured.

Once the SCSI command processors 211 through 217 are in a functioning state, in S830 the SCSI command processor 211 issues an "Inquiry" to the logic unit LUN0.

In response to this inquiry, in S835 the PC 22 receives the response "removable disk" from the logic unit LUN0. Here, the PC 22 loads the removable disk driver 221 provided standard in the OS for SCSI connections, and links the removable disk driver 221 to the file system 231, causing a drive letter to be assigned to the logic unit LUN0. This drive letter also appears in Explorer 277.

In S840 the SCSI command processor 213 issues an "Inquiry" to the logic unit LUN1. In response to this inquiry, in S845, the PC 22 receives the response "communication device" from the logic unit LUN1. This point differs from the first embodiment. The PC 22 loads the COM port driver 228 provided by the manufacturer for SCSI connections.

In S850 the SCSI command processor 215 issues an "Inquiry" to the logic unit LUN2. In response to this inquiry, in S855, the PC 22 receives the response "communication device" from the logic unit LUN2. This point also differs from the first embodiment. The PC 22 loads the COM port driver 229 provided by the manufacturer for SCSI connections.

In S860 the SCSI command processor 217 issues an "Inquiry" to the logic unit LUN3. In response to this inquiry, in S865, the PC 22 receives the response "communication device" from the logic unit LUN3. The PC 22 loads the COM port driver 227 provided by the manufacturer for SCSI connections.

The process of S315 shown in FIG. 6 ends after completing the process for loading dynamic drivers described in FIG. 13. The remaining process is identical to that described in the first embodiment.

In addition to the advantages obtained by the first embodiment, the second embodiment can share SCSI-compliant COM port drivers for the printer function, scanner function, and PC-FAX function. Hence, a printer driver and scanner driver capable of controlling the printer device and scanner device via the COM port drivers can be used in place of a SCSI-compliant printer driver and SCSI-compliant scanner driver.

Therefore, the printer driver and scanner driver can be configured of device drivers that are not restricted by the SCSI standard, but that conform to a unique standard, for example.

Variations of the Embodiments

While the invention has been described in detail with reference to specific embodiments thereof, it would be apparent to those skilled in the art that many modifications and variations may be made therein without departing from the spirit of the invention, the scope of which is defined by the attached claims.

For example, while the card reader function is assigned to LUN0 in the embodiments described above, a function corresponding to another data storage device may be assigned to the LUN0, such as a function corresponding to another removable disk, CD-ROM drive, hard disk, or magneto-optical disk drive.

What is claimed is:

1. A multifunction device comprising:
a function execution device configured to execute a plurality of functions selected from among a printer function, scanner function, facsimile function, and data storage function and capable of being connected to a computer via a Universal Serial Bus (USB) interface;
a device data outputting unit that outputs information forcing an OS in the computer to recognize the multifunction device as a USB storage class device having a plurality of USB-compliant logic unit numbers (LUNs) when establishing a connection with the computer, wherein each of the plurality of functions is assigned a LUN; and
a controlling unit that determines, when output data is transmitted from the computer, which one of the plurality of functions the output data is for controlling, based on the LUN included in the output data, and that controls the determined function based on the output data.

2. A multifunction device according to claim 1, wherein the device data outputting unit is configured so as to be capable of outputting data forcing the computer to recognize a function associated with each of the plurality of LUNs,
the device data outputting unit outputting data indicating a SCSI-compliant printer device when possessing a printer function,
the device data outputting unit outputting data indicating a SCSI-compliant scanner device when possessing a scanner function,
the device data outputting unit outputting data indicating a SCSI-compliant communication device when possessing a facsimile function, and
the device data outputting unit outputting data indicating a SCSI-compliant removable disk when possessing a data storage function.

3. A multifunction device according to claim 1, wherein the device data outputting unit is configured so as to be capable of outputting data forcing the computer to recognize a function associated with each of the plurality of LUNs,
the device data outputting unit outputting data indicating a SCSI-compliant communication device when possessing any of the printer function, scanner function, and facsimile function, and
the device data outputting unit outputting data indicating a SCSI-compliant removable disk when possessing a data storage function.

4. A device control system comprising:
a computer; and
a multifunction device having a plurality of functions selected from among a printer function, scanner function, facsimile function, and data storage function,
the computer and the multifunction device being connected with each other via a universal serial bus (USB) interface,
the multifunction device comprising:
a device data outputting unit that outputs information forcing an OS in the computer to recognize the multifunction device as a USB storage class device having a plurality of USB-compliant logic unit numbers (LUNs} when establishing a connection with the computer, wherein each of the plurality of functions is assigned a LUN; and
a device controlling unit that, when output data is transmitted from the computer, determines which one of the plurality of functions the output data is for controlling, based on the LUN included in the output data, and that controls the determined function based on the output data,
the computer comprising a computer controlling unit that transfers output data from the computer to the multifunction device, based on an instruction issued from a data processor provided in the computer to control one of the plurality of functions, the output data including an LUN corresponding to the function that is the target of control.

5. A device control system according to claim 4, wherein the device data outputting unit in the multifunction device is configured so as to be capable of outputting data forcing the computer to recognize a function associated with each of the plurality of LUNs,
the device data outputting unit outputting data indicating a SCSI-compliant printer device when possessing a printer function,
the device data outputting unit outputting data indicating a SCSI-compliant scanner device when possessing a scanner function,
the device data outputting unit outputting data indicating a SCSI-compliant communication device when possessing a facsimile function, and
the device data outputting unit outputting data indicating a SCSI-compliant removable disk when possessing a data storage function, and
wherein the computer controlling unit of the computer loads, based on data transmitted from the multifunction device, a device driver corresponding to a function transferred from the multifunction device, the device driver being either one of a SCSI-compliant printer driver corresponding to a printer device, a SCSI-compliant scanner driver corresponding to a scanner device, a SCSI-compliant COM port driver corresponding to a communication device, and a SCSI-compliant removable disk driver corresponding to a removable disk.

6. A device control system according to claim 4, wherein the device data outputting unit of the multifunction device is configured so as to be capable of outputting data forcing the computer to recognize a function associated with each of the plurality of LUNs, the device data outputting unit outputting data indicating a SCSI-compliant communication device when possessing any of the printer function, scanner function, and facsimile function, and the device data outputting unit outputting data indicating a SCSI-compliant removable disk when possessing a data storage function, and wherein the computer controlling unit of the computer loads, based on data transmitted from the multifunction device, a device driver corresponding to a function transferred from the multifunction device, the device driver being either one of an SCSI-compliant COM port driver corresponding to a printer device, an SCSI-compliant COM port driver corresponding to a scanner device, and an SCSI-compliant COM port driver corresponding to a communication device, and a SCSI-compliant removable disk driver corresponding to a removable disk, the computer controlling unit loading, when the COM port driver corresponding to the printer device is loaded, a printer driver that is capable of controlling the printer device via the COM port driver corresponding to the printer device, and the computer controlling unit loading, when the COM port driver corresponding to the scanner device is loaded, a scanner driver that is capable of controlling the scanner device via the COM port driver corresponding to the scanner device.

* * * * *